(12) United States Patent
Saadatzi et al.

(10) Patent No.: US 12,719,389 B2
(45) Date of Patent: Aug. 25, 2026

(54) HIGH VOLTAGE ENERGY HARVESTING AND SENSING WITH 3D SPIRAL DESIGN

(71) Applicant: University of South Carolina, Columbia, SC (US)

(72) Inventors: Mohammad Sadegh Saadatzi, Columbia, SC (US); Sourav Banerjee, Irmo, SC (US)

(73) Assignee: University of South Carolina, Columbia, SC (US)

( * ) Notice: Subject to any disclaimer, the term of this patent is extended or adjusted under 35 U.S.C. 154(b) by 1078 days.

(21) Appl. No.: 17/720,382

(22) Filed: Apr. 14, 2022

(65) Prior Publication Data

US 2022/0337178 A1 Oct. 20, 2022

Related U.S. Application Data

(60) Provisional application No. 63/174,626, filed on Apr. 14, 2021.

(51) Int. Cl.
*H02N 2/18* (2006.01)
*H02N 2/00* (2006.01)

(52) U.S. Cl.
CPC ............... *H02N 2/188* (2013.01); *H02N 2/22* (2013.01)

(58) Field of Classification Search
CPC .... H10N 30/857; H10N 30/308; H02N 2/188; H02N 2/22
See application file for complete search history.

(56) References Cited

U.S. PATENT DOCUMENTS

| | | | | |
|---|---|---|---|---|
| 10,694,466 | B2 * | 6/2020 | Banerjee | H02N 2/188 |
| 2004/0017129 | A1 * | 1/2004 | Hooley | H04R 17/00 310/311 |
| 2010/0084947 | A1 * | 4/2010 | Yoon | H10N 30/306 310/339 |
| 2011/0309723 | A1 * | 12/2011 | Lu | H02N 2/181 310/339 |

FOREIGN PATENT DOCUMENTS

| | | | | |
|---|---|---|---|---|
| DE | 102004056754 | A1 * | 6/2006 | H10N 30/073 |
| WO | WO-0147041 | A2 * | 6/2001 | H10N 30/2042 |

* cited by examiner

*Primary Examiner* — J. San Martin
(74) *Attorney, Agent, or Firm* — Douglas L. Lineberry

(57) ABSTRACT

Described herein is a novel piezoelectric energy harvester based on a metamaterial structure capable of scavenging energy from multiple low-frequency ambient vibrations employing a mass-in-mass Phononic crystal structure and comprised of a piezoelectric snail structure, encapsulated in a cylindrical rubber matrix, and encased in a rigid cubic frame.

23 Claims, 11 Drawing Sheets

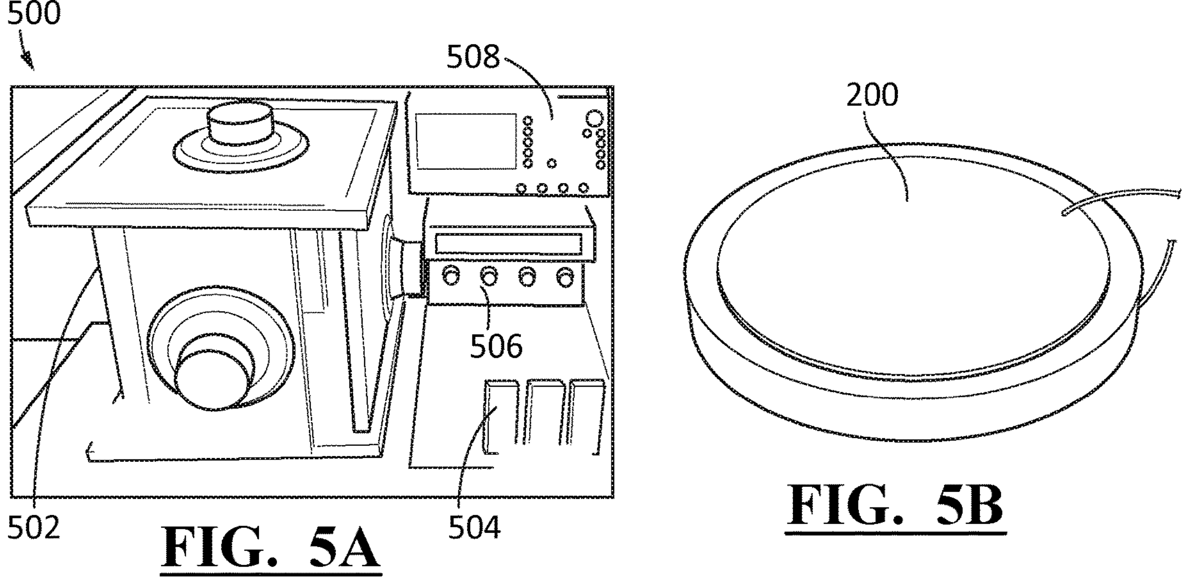
FIG. 5A
FIG. 5B
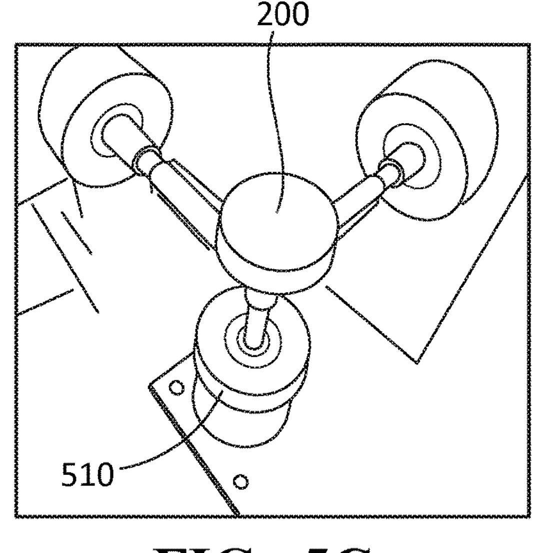
FIG. 5C
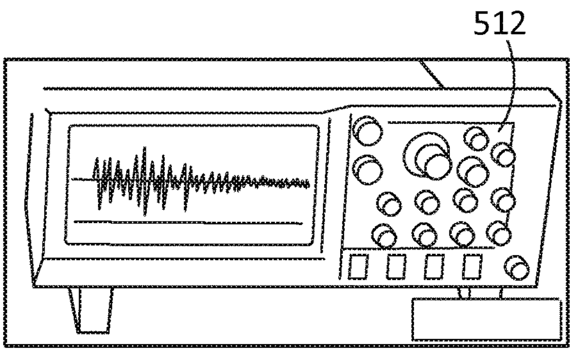
FIG. 5D

TABLE 1

| Material | Density (kg/m$^3$) | Modulus of Elasticity (Pa) | Poisson's Ratio |
|---|---|---|---|
| Polyvinylidene Difluoride | 1780 | 2.8e$^9$ | 0.18 |
| Silicone | 970 | 99e$^5$ | 0.49 |
| Aluminum | 2700 | 6.89e$^{10}$ | 0.33 |

FIG. 9

HIGH VOLTAGE ENERGY HARVESTING AND SENSING WITH 3D SPIRAL DESIGN

TECHNICAL FIELD

The subject matter disclosed herein is generally directed to a novel piezoelectric energy harvester based on a metamaterial structure capable of scavenging energy from multiple low-frequency ambient vibrations employing a mass-in-mass Phononic crystal structure and comprised of a piezoelectric snail structure, encapsulated in a cylindrical rubber matrix, and encased in a rigid cubic frame.

BACKGROUND

Research into electrical power consumption show that electrical energy consumption will increase significantly to more than double globally from 2008 through 2035. Life in the present day cannot be imagined without energy. Since, the massive use of energy in various forms has increased in our lives, so the urge to look for different, alternative sources of power has also arisen. Ambient energy harvesting has been a major point of interest. Low power energy harvesters are being designed, which are capable of harvesting energy from the ambient sources. Research interests are increasing in this field and several activities on this topic can be found in various literature.

Due to the limited availability and high depletion rates of nonrenewable energy sources as well as environmental concerns, the scientific community is urged to explore and harness alternative, clean energy sources. One most frequently considered alternative clean source of energy is the acoustic energy, e.g. ambient vibration, industrial noises, mechanical daily actions like, walking, running, talking, travel etc. Harvester that can harvest acoustic energy from such sources must produce high current output to charge an external battery for reuse.

Recent advancements in low power electronics devices, micro electromechanical systems, wireless sensors have significantly increased the power demand in our present digital economy. The increased use of cell phones, iPods, tablets, iPads throughout the world resulted surprisingly large energy footprint and according to 'International Energy Agency' (IEA), household energy demand has increased by 3.4% since 1990. It is calculated that in the US, only the usage of smart phones demands 1269000 Million Watt-hour of energy per year. One most frequently considered alternative clean source of energy is acoustic energy, e.g. ambient vibration, industrial noises, mechanical daily actions like, walking, running, talking, travel etc. These are mostly confined below very low acoustic frequency <~5 kHz that could alleviate the power demands significantly. We need a new physics with sub-wavelength scale model for harvesting energies at lower frequencies (<—5 KHz). The inventors proposed such a model in U.S. Pat. No. 10,694,466. However, harvesting energy from low frequencies while maintaining high current to charge external battery is challenging.

The primary shortcoming of such harvesters is that they harvest energy from high frequencies (~>10 KHz). Such harvesters are good for MEMS devices where such frequencies could be achieved. But ambient noise could not go to such high frequencies.

Accordingly, it is an object of the present disclosure to provide ~3 times higher voltage and current output compared to the state-of-the-art for a fixed load battery. The current disclosure provides a novel piezoelectric energy harvester based on a metamaterial structure is proposed, which is capable of scavenging energy from multiple low-frequency ambient vibrations while producing high voltage output. The proposed energy harvester is based on a Phononic crystal structure but utilizes a new concept of embedding piezoelectric snail structure (we call Shear Force Enhanced Spiral Spring Membrane Harvester), encapsulated in a cylindrical rubber matrix, and encased in a rigid frame. By virtue of the process and the design, while harvesting from low frequencies, the disclosure can provide ~3 time higher voltage output and current compared to the state of the art, for a fixed load battery Citation or identification of any document in this application is not an admission that such a document is available as prior art to the present disclosure.

SUMMARY

The above objectives are accomplished according to the present disclosure by providing in one instance a novel energy harvester. The harvest may include at least one piezoelectric membrane that has at least one phononic crystal formed into a three-dimensional spiral pattern, a matrix to contain the piezoelectric membrane wherein the matrix is designed to allow the piezoelectric membrane three-dimensional spiral pattern to flex and deform, and a casing enclosing the matrix and the piezoelectric membrane. Further, the three-dimensional spiral pattern may define at least four spirals in the three-dimensional spiral pattern. Again, the piezoelectric membrane may be formed from polyvinylidene fluoride. Still, the matrix may be formed from silicone or polydimethylsiloxane. Yet further, at least one spiral plane of the piezoelectric membrane may oriented substantially parallel to a casing top and casing bottom enclosing the matrix and the at least one piezoelectric membrane. Moreover, the casing may be formed from aluminum. Further yet, two or more piezoelectric membranes may be contained within the matrix. Still moreover, the two or more piezoelectric membranes are spaced horizontally and vertically from one another. Yet again, the two or more piezoelectric membranes may be oriented in opposite directions with respect to one another in the matrix. Even further, the two or more piezoelectric membranes may be separated into at least two layers in the matrix wherein the two or more piezoelectric membranes do not occupy the same plane in the matrix. Still moreover, at least one resonance frequency may be trapped within the matrix as dynamic strain energy. Even further, the at least one resonance frequency trapped within the matrix as dynamic strain energy is changed from one resonance frequency to a different resonance frequency by changing a size of the at least one piezoelectric membrane or the casing. Further again, the novel energy harvester may be contained within a floor tile, carpet section, mat, wall, or shoe sole.

In a further instance, a method for making a novel energy harvester is provided. The method may include forming at least one piezoelectric membrane comprising at least one phononic crystal, forming the at least one piezoelectric membrane comprising at least one phononic crystal into a three-dimensional spiral pattern, creating a matrix to contain the piezoelectric membrane wherein the matrix allows the piezoelectric membrane comprising the three-dimensional spiral pattern to flex and deform, and forming a casing to enclose the matrix and the piezoelectric membrane. Further, the three-dimensional spiral pattern may be defined to have at least four spirals in the three-dimensional spiral pattern. Yet still, the piezoelectric membrane may be formed from polyvinylidene fluoride. Further again, orienting opposing surfaces of the polyvinylidene fluoride substantially parallel to the casing top and bottom enclosing the matrix and piezoelectric membrane. Again, two or more piezoelectric membranes may be included within the matrix. Still further, the two or more piezoelectric membranes may be spaced horizontally and vertically from one another. Even further, the two or more piezoelectric membranes may be oriented in opposite directions with respect to one another in the matrix. Moreover, the two or more piezoelectric membranes may be separated into at least two layers in the matrix wherein the two or more piezoelectric membranes do not occupy the same plane in the matrix. Yet further, the method includes trapping at least one resonance frequency within the matrix as dynamic strain energy. Further still, the at least one resonance frequency trapped within the matrix as dynamic strain energy may be changed from one resonance frequency to a different resonance frequency by changing a size of the at least one piezoelectric membrane comprising at least one phononic crystal or the casing.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIGS. 5A-5D show a testing setup for a harvester cell unit of the current disclosure.

FIG. 9 shows Table 1, material properties used during numerical analysis.

Figure 1:
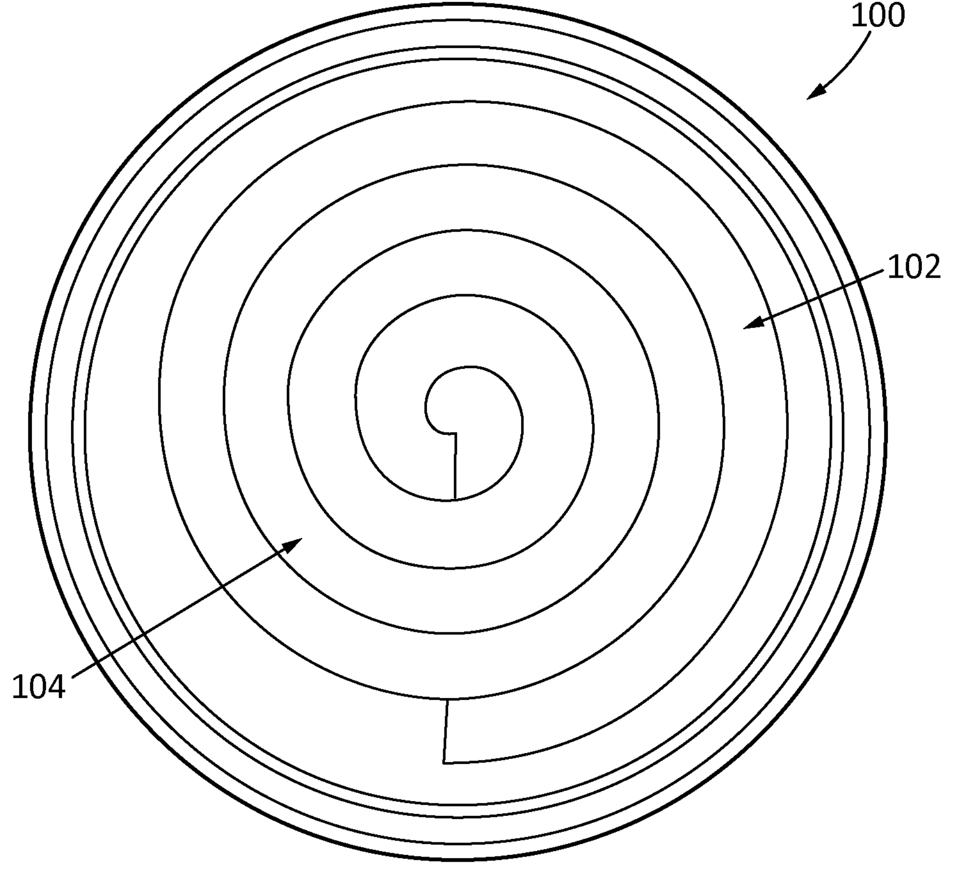
FIG. 1 shows one embodiment of a coil of the current disclosure.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

Almost every individual in the US and majority of world population (~4 billion) use some form of electronic device (laptops, tablets, cell phones, kindle, laser pointer, many other numerous biomedical related electronic devices). That will increase the energy demand by a factor of ~2 for charging electronic devices alone. Hence, a small-scale energy harvester could be a product of every household soon.

Due to increased time in front of the computers and gadgets, demand of silicone based ergonomic gel products are increasing, having almost tripled in the past three (3) years.

This disclosure created opportunity to alleviate energy demand and increase use of ergonomic products. Household carpets, walls, floor tiles, door mats, kitchen mats, bed mattresses, literally, wherever soft gels may be used, could be the potential target application of the herein disclosed harvester technology. Although futuristic, wearable artificial skin (made of soft gel) could potentially sense touch, pressure, thermal gradient, if the disclosure is used in it as a sensor while simultaneously harvesting energy from the skin too.

Energy harvesting from metamaterial structure, see U.S. Pat. No. 10,694,466 "Power optimization for a unit cell metamaterial energy harvester" hereby incorporated by reference, can produce energy from ambient vibration with optimized power output. However, time required to charge an external battery using an energy harvester depends on the voltage output and the current flow to the battery. Time required to charge a battery is inversely proportional to the current flow. The higher the voltage output, the less the time it takes to charge a battery. Hence, in order to achieve higher voltage and higher current output, a novel model harvester, herein dubbed Shear Force Enhanced Spiral Spring Membrane Harvester is proposed.

In this concept, a 2D Piezoelectric Membrane is cut or deposited into a spiral pattern and then mechanically lifted to make a 3D spiral. The 3D spiral provides extraordinary longitudinal and shear coupling when deformed. Next the 3D spiral was embedded into a soft matrix to hold the structure permanently while it retains the flexibility to deform. Further, the entire soft material is then enclosed into a hard casing. This very basic process and the 3D pattern of embedding smart material into soft constituents—a metamaterial architecture helps to enhance the voltage output by ~3 times. Hence, charging a battery will be much quicker, —3 times faster using the proposed design.

We envision the following applications: (a) floor tiles, carpet, mat, and household and industrial walls where mechanical contact, vibration and acoustic energy interactions are maximum; (b) shoe soles where deformable soft elastomers, gelatins or Silicone, are used and subjected to pressure during use; (c) any ergonomic components, where Silicone or soft elastomers are used and subjected to pressure during use; and (d) soft artificial skin to sense pressure, temperature and also harvest energy from touch. Smart Sonic Crystal could harvest energy from frequencies as low as ~300 Hz as per our proof of concept.

Figure 2:
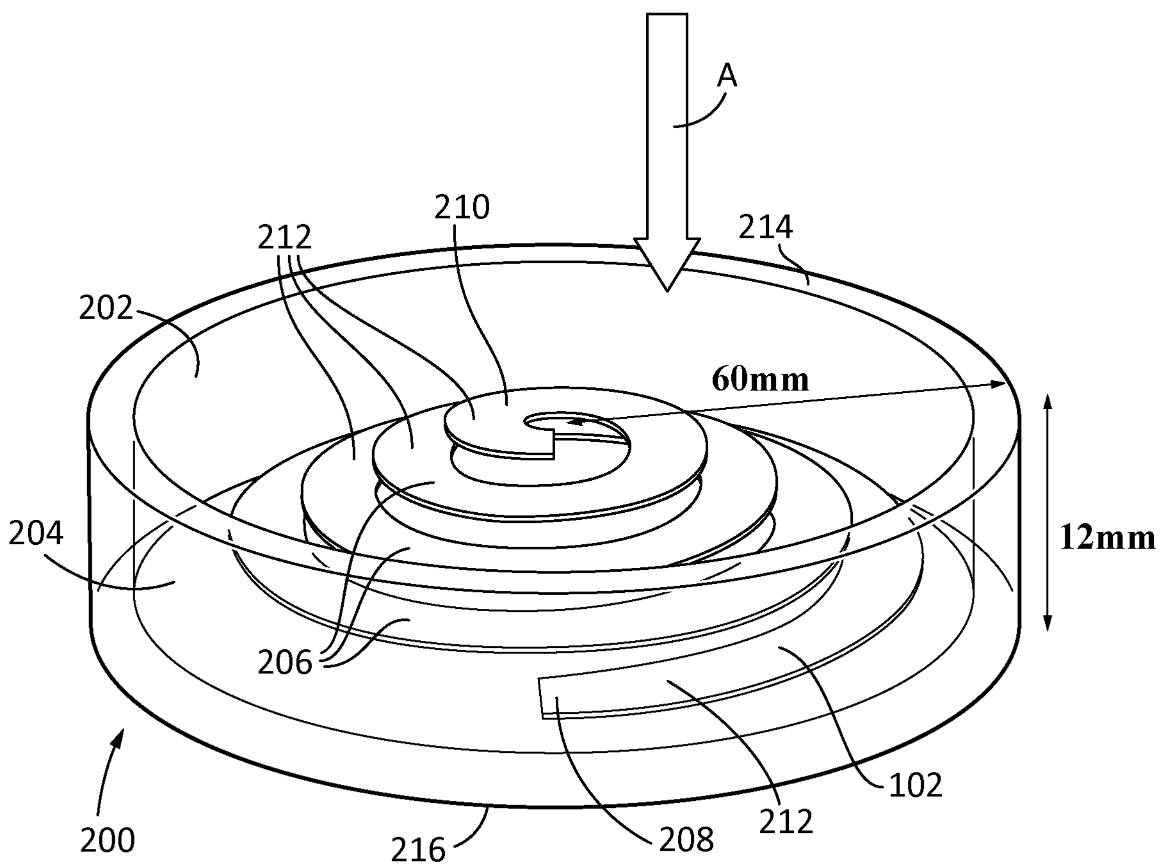
FIG. 2 shows one embodiment of an energy harvester cell unit of the current disclosure.
Figure 3:
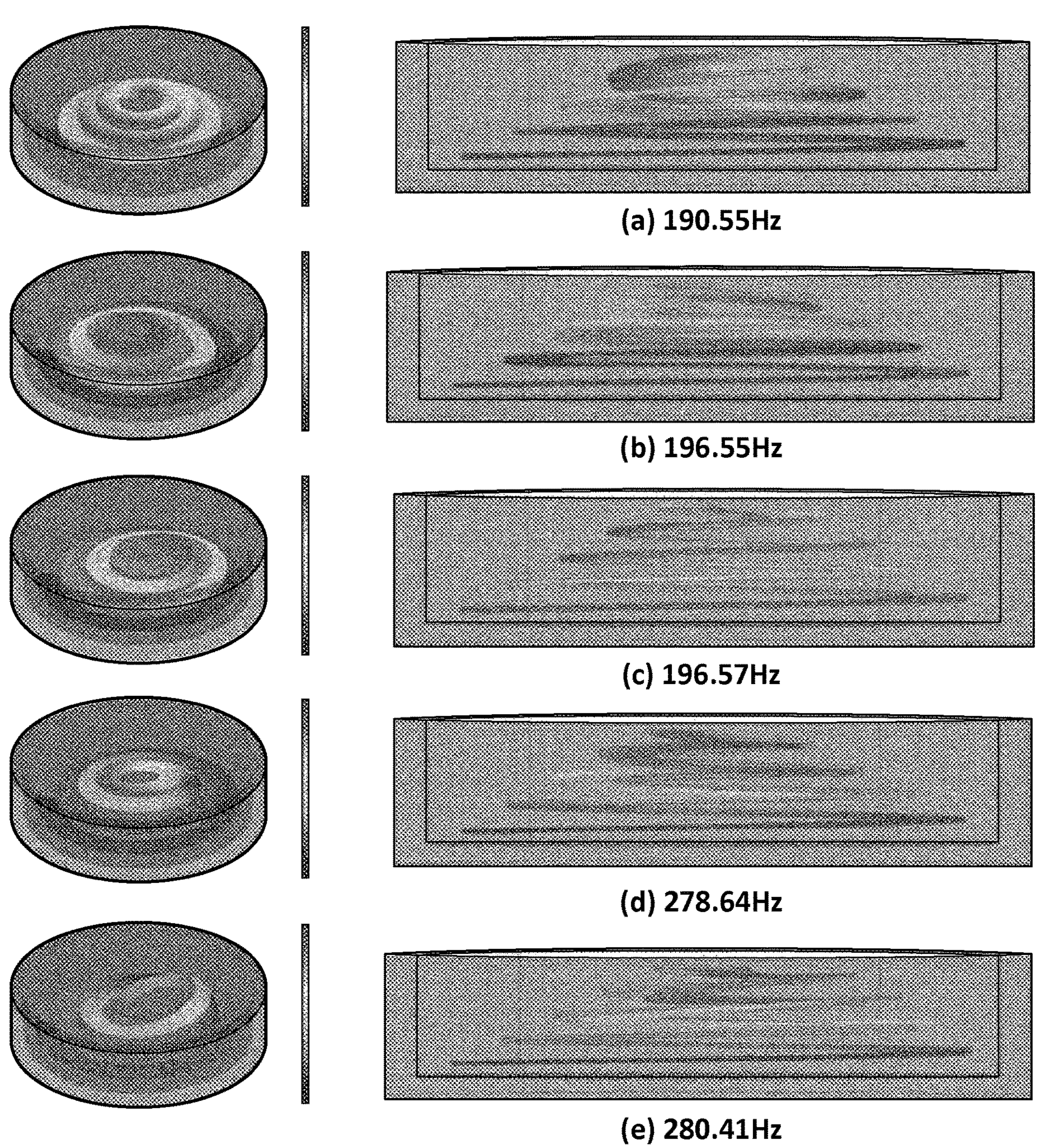
FIG. 3 shows energy profiles and spiral deformation of a multi-coil structure during use.
Figure 4:
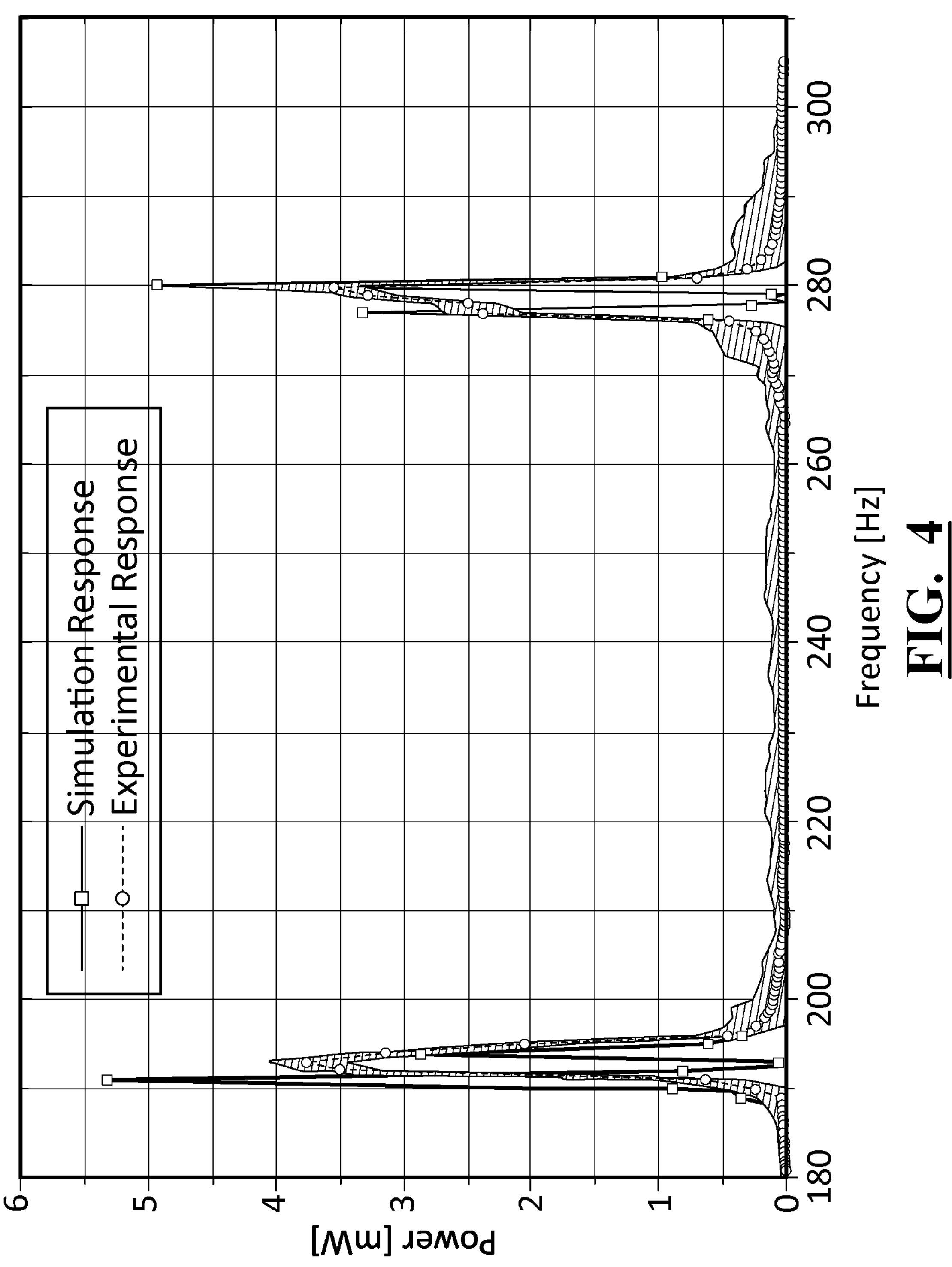
FIG. 4 shows simulation and experiment response data for the current disclosure.

FIG. 1 shows one embodiment of coil 100 of the current disclosure including a three-dimensional, multi-coil structure 102, which in one embodiment may be four coils with 200 μm thickness with a 5 mm width and 10 mm spring height, and a PVDF film 104. FIG. 2 shows one embodiment of an energy harvester cell unit 200 that may include a matrix 202, which may be silicon, and frame 204, which may be aluminum, as well as house multi-coil structure 102. Multi-coil structure may include spirals 206, that may be shaped in one embodiment as concentric circles, but other shapes are considered within the scope of this disclosure, decreasing in radius from coil bottom 208 to coil apex 210. Spirals 206 may include spiral planes 212 that may be oriented substantially parallel or parallel to both casing top 214 and casing bottom 216. This orientation allow force, represented by arrow A, impacting on energy harvester unit 200 to be captured and converted as disclosed herein. As FIG. 2 shows, force A is substantially perpendicular or perpendicular to spiral planes 212. FIG. 3 shows energy profiles and spiral deformation of multi-coil structure 102 during use. FIG. 4 shows simulation and experiment response data for the current disclosure. FIG. 5 shows a testing setup 500 for a harvester cell unit 200. Set-up 500 may include an exciter generator 502, signal amplifier 504, DC power supply 506, signal generator 508, holding structure 510 to hold energy harvester cell unit 200, and oscilloscope 512.

Figure 6:
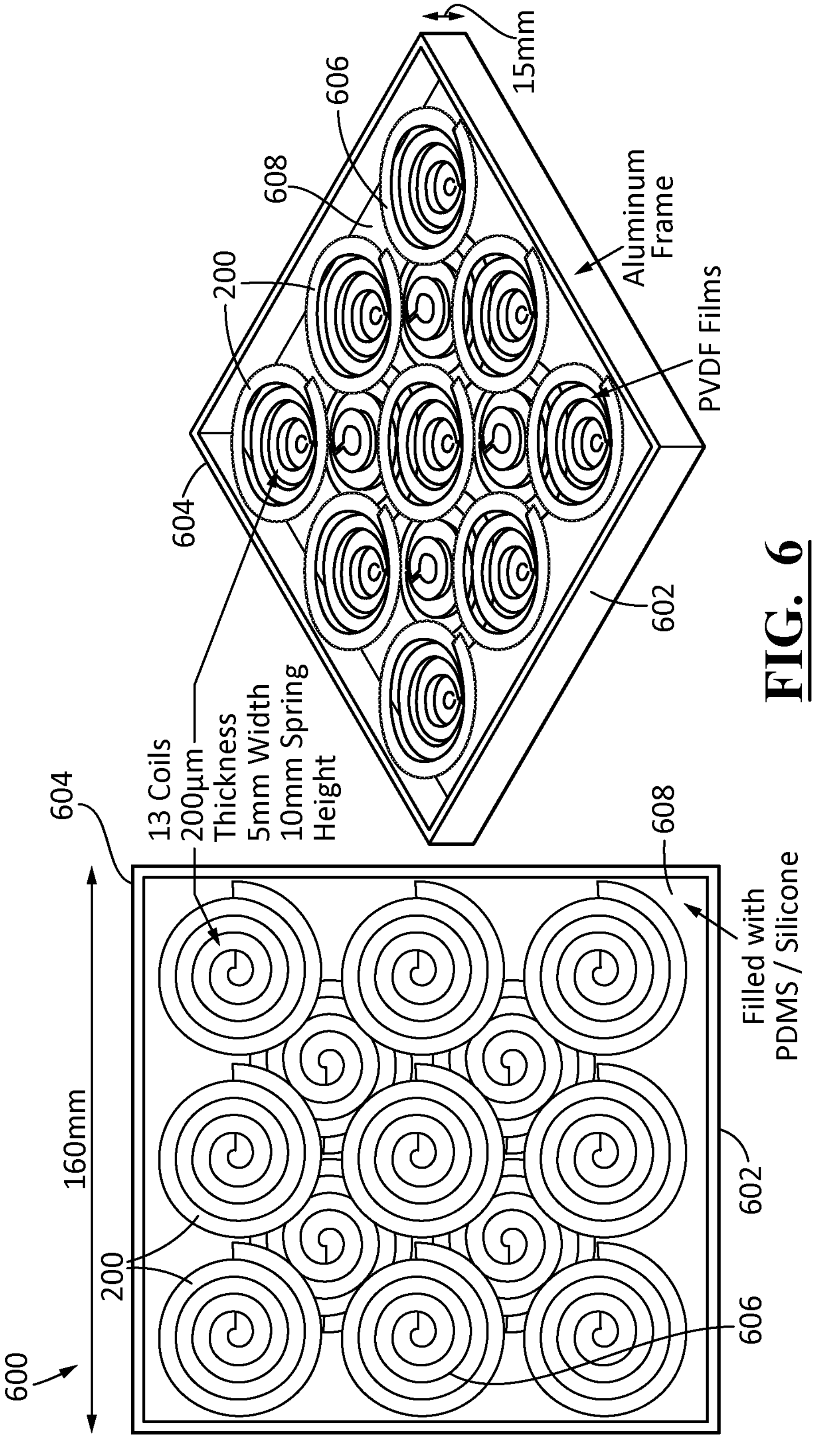
FIG. 6 shows a multi-harvester formation with multiple energy harvester cell units embedded in a containment structure.
Figure 7:
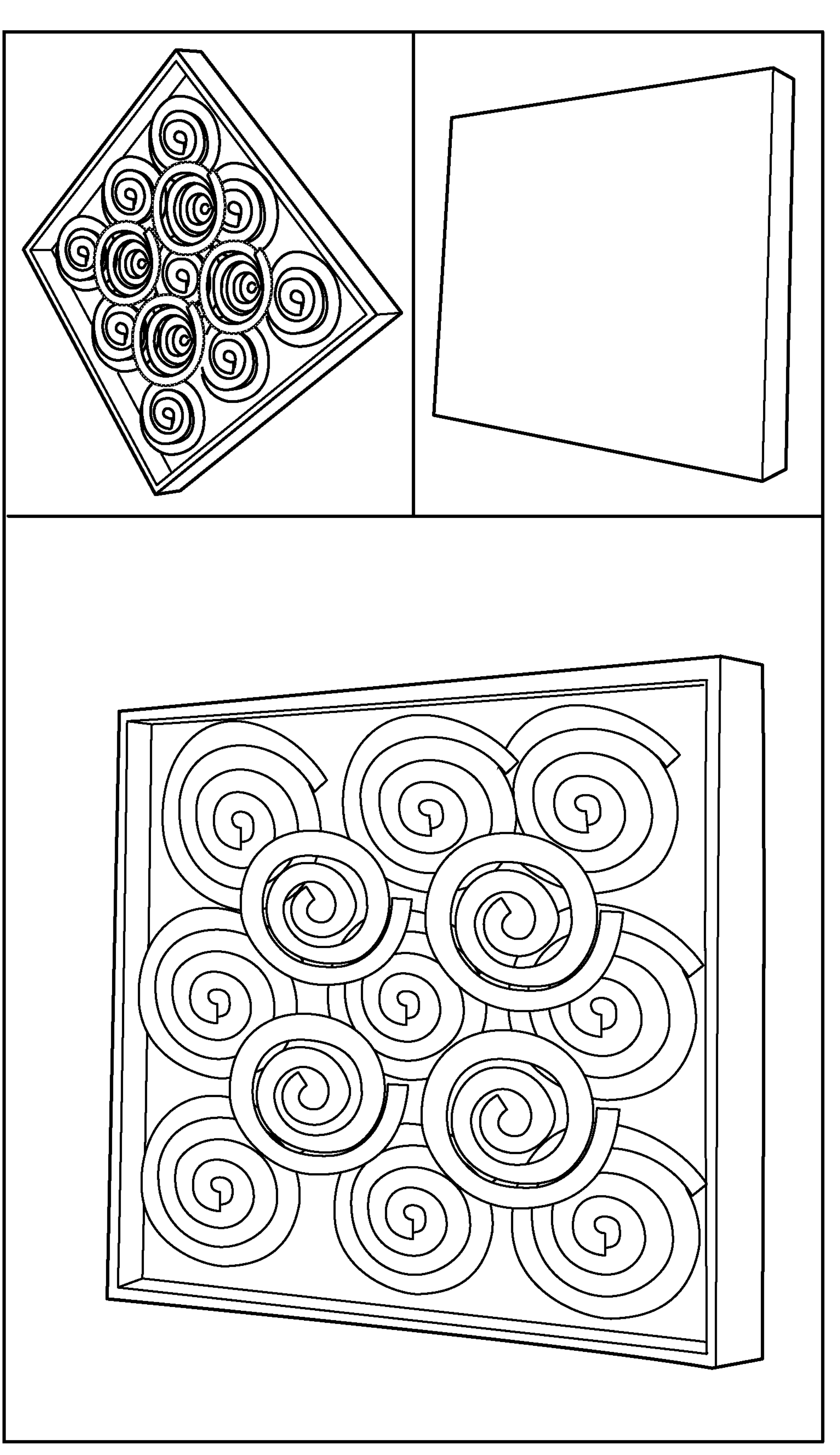
FIG. 7 shows a fabricated example of FIG. 6.
Figure 8:
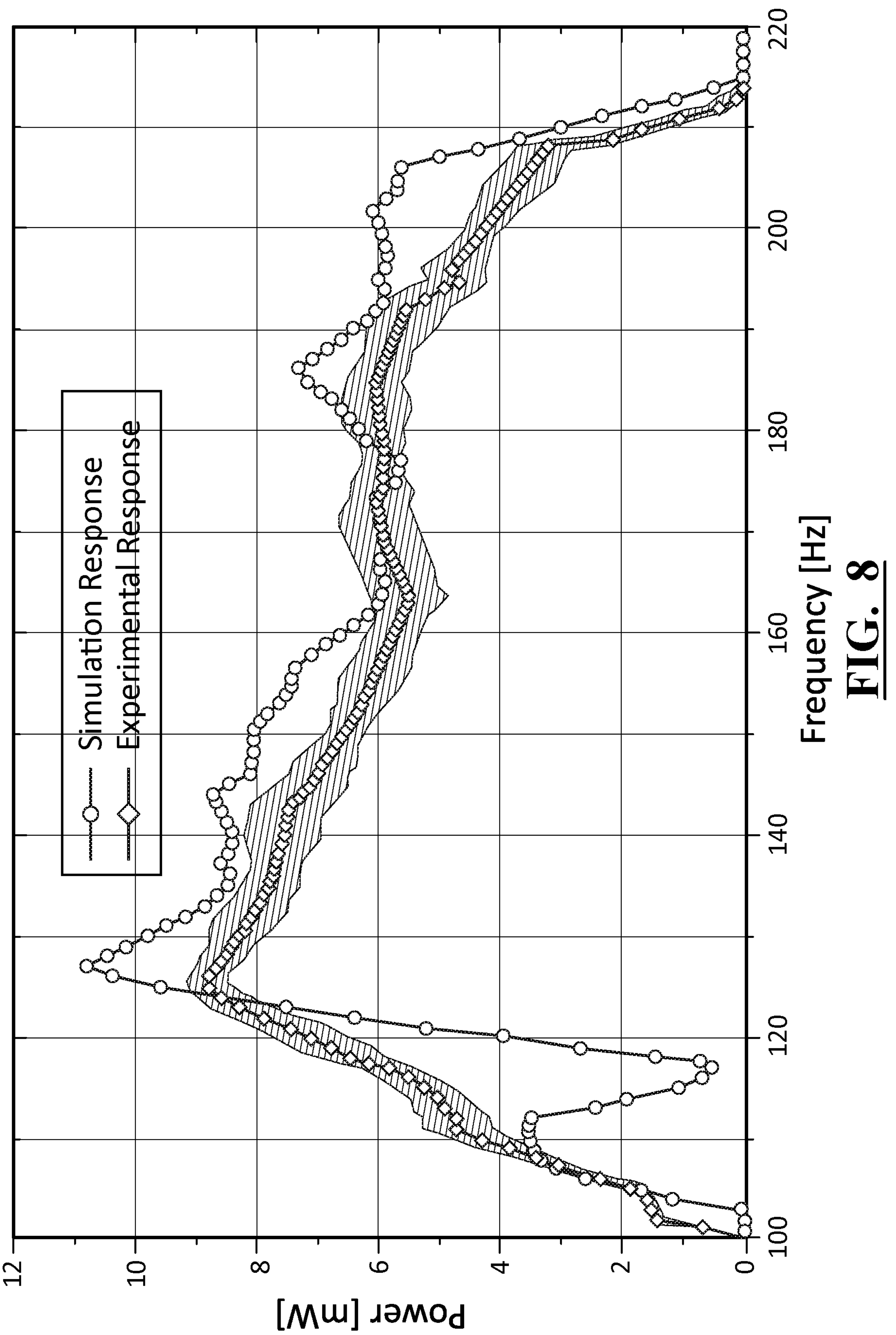
FIG. 8 shows test results of the fabricated example shown in FIG. 6.

FIG. 6 shows a multi-harvester formation 600 wherein multiple energy harvester cell units 200 may be embedded in a containment structure 602, such as frame 604, which may be aluminum and fitted with PVDF film 606 and filled with PDMS and/or silicone 608. As FIG. 6 shows, energy harvester cell units 200 may be spaced horizontally and vertically from one another as well as oriented in distinct layers, such as 1, 2, 3, 4, 5, or more layers, within matrix 202—wherein the harvesters do not occupy the same plane with respect to one another—within containment structure 602. The harvesters may also be oriented in opposite directions, see FIG. 6, such that apex 210 and bottom 208 of different harvesters may be facing opposite directions, such as some harvesters with the apexes 210 oriented toward casing top 214 and some with their apexes 210 oriented toward casing bottom 216. Other orientations are also considered within the scope of this disclosure such as apexes 210 at angles from one another such as from 0 to 90 degrees such that apexes 210 and bottoms 208 could be oriented substantially perpendicular or "tilted" or offset from one another in order to better capture force A from multiple directions with respect to frame 204. FIG. 7 shows a fabricated example of FIG. 6. FIG. 8 shows test results of fabricated example shown in FIG. 7.

Herein, a novel piezoelectric energy harvester based on a metamaterial structure is proposed, which is capable of scavenging energy from multiple low-frequency ambient vibrations. The proposed energy harvester is based on a mass-in-mass Phononic crystal structure and is comprised of a piezoelectric snail structure, encapsulated in a cylindrical rubber matrix, and encased in a rigid cubic frame. The proposed cell behaves effectively such as a negative mass in the vicinity of its resonance frequencies and entraps the vibration energy as dynamic strain. The captured kinetic energy is then transformed to electric potential using the PVDF structure, optimally embedded in the cell's soft constituent. The proposed energy harvester cell is numerically modeled via COMSOL Multiphysics software and experimentally validated in Acoustic Vibration Laboratory.

Beeby et al. reviewed various journals dealing with electrical energy scavengers and harvesters for smart structures such as wireless microsystems and energy harvesters' sensors and perceived that among all these systems, a majority of them are spring mass systems with three categories of transduction mechanical structure. To name a few, we can mention mechanisms such as: piezoelectric base mechanisms, structures that work based on electromagnetic technology and, finally intelligent systems inspired from electrostatic structures. See, S. P. Beeby, M. J. Tudor, and N. White, "Energy harvesting vibration sources for microsystems applications," *Measurement Science and Technology*, vol. 17, no. 12, p. R175, 2006.

From 2002, by increasing the growth rate of interests in energy harvesting, energy harvesting using smart structures fabricated out of piezoelectric transduction mechanisms have expanded considerations in the electrical sensors industry. A recently reviewed paper on this topic verifies the increased application of low power gadgets, mems systems, actuators and harvester sensors etc., which have vastly increased interests in the systems and mechanisms that work based on ambient mechanical vibration energy. See, R.

Ahmed, F. Mir, and S. Banerjee, "A review on energy harvesting approaches for renewable energies from ambient vibrations and acoustic waves using piezoelectricity," *Smart Materials and Structures*, vol. 26, no. 8, p. 085031, 2017.

The main concern and challenge of this field of research is the low amount of the harvested electric power using developed energy harvesters. Much research has been performed with the aim of harvesting higher energy by creating systems such as electromagnetic energy harvester systems with closed magnetic circuit. However, electromagnetic harvesters have higher efficiency compared to other harvesters, but still the harvested electrical power output of these systems is in the range of microwatts (μw) range. From the many research papers in this field, the mechanism of many energy harvester systems is the presence of a cantilever beam structure with piezoelectric materials attached to it. The electrical power harvested from these harvester mechanisms is in the range of microwatts as well. These electrical energy harvesters are utilized in applications for supplying low energy for low power electronics devices. The efficiency of these electrical energy harvesters for low power electronics and recharging low-amp batteries have been already investigated by Sodano et al. See, H. A. Sodano, D. J. Inman, and G. Park, "Comparison of piezoelectric energy harvesting devices for recharging batteries," *Journal Of Intelligent Material Systems and Structures*, vol. 16, no. 10, pp. 799-807, 2005.

Increased applications of energy harvesters for low-power devices, smart phones, GPS systems, hand watch devices and micro-electromechanical systems or sensors, have been reported which show the raised significant attention in the field of piezoelectric base energy harvesting technology. R. Ahmed, F. Mir, and S. Banerjee, "A review on energy harvesting approaches for renewable energies from ambient vibrations and acoustic waves using piezoelectricity," *Smart Materials and Structures*, Vol. 26, No. 8, p. 085031, 2017. Electric power is generated and harvested when an energy harvester, which has piezoelectric active materials in its structure, is mechanically stressed. The majority of such harvesters are fashioned as cantilever beams integrated with piezoelectric materials, see A. Erturk and D. J. Inman, "An experimentally validated bimorph cantilever model for piezoelectric energy harvesting from base excitations," *Smart Materials and Structures*, vol. 18, no. 2, p. 025009, 2009, and function based on the resonance phenomenon as the operating principle. For instance, millimeter cantilever (4 to 10 mm) energy scavengers have been designed targeted for frequencies in the range of 20 kHz to 3 MHz. However, the harvested electric potential from low-frequency vibrations by these cantilever-based mechanisms is difficult as the output charge rapidly degenerates with the reduction of vibration frequency. The structure geometry principles of such energy harvesters based on cantilever beams do not easily translate to a low-frequency vibration domain; they would need larger fabricated cantilever beam dimensions for low frequencies. Electrical energy harvesting from low-frequency ambient vibrations is attractive due to the abundance of vibrational sources.

To improve and resolve problems interrelated with low-frequency vibration-based energy harvester devices, different structures of energy harvesters utilizing piezoelectric inspired metamaterials have been investigated. Traditionally, researchers utilize conventional materials for energy harvester devices. However, these materials do not possess the ability to respond to different vibrations across a wide range of frequencies. Thus, to address this incapability, application of metamaterials has been proposed. Metamaterials are artificial materials engineered to have properties that have not yet been found in nature. See, M. M. Indaleeb, H. Ahmed, M. Saadatzi, and S. Banerjee, "Dirac-like cone modulation for phononic crystals using deaf band," in *Health Monitoring of Structural and Biological Systems XIII,* 2019, vol. 10972, p. 109721Z: International Society for Optics and Photonics.

Acoustic metamaterials are conventionally used for controlling and guiding acoustic waves and vibrations and obey the laws of negative refractive index materials, obtained via the modification of the mass density and bulk modulus. A negative modulus may cause an element to expand while under compression, whereas a medium with negative density may accelerate in the opposite direction of applied force at particular frequencies. M. M. Indaleeb, S. Banerjee, H. Ahmed, M. Saadatzi, and R. Ahmed, "Deaf band based engineered Dirac cone in a periodic acoustic metamaterial: A numerical and experimental study," *Physical Review B*, vol. 99, no. 2, p. 024311, 2019.

Such metamaterials act like stop-band filters for vibrational waves by trapping them inside their constituents as strain energy. Therefore, it has been suggested to capture and transform this kinetic energy to electric potential with the introduction of active materials capable of electromechanical transduction. During the designing and optimizing the cantilever inspired vibration-based energy harvesters, the extreme movement of the cantilever beams and the excitation frequency should be carefully investigated. It has been reported that, the electromechanical conversion efficiency of the latest cantilever beam structures is still lower than 50%, which is considered significant energy wastage. See L. Deng, Q. Wen, S. Jiang, X. Zhao, and Y. She, "On the optimization of piezoelectric vibration energy harvester," *Journal of Intelligent Material Systems and Structures*, vol. 26, no. 18, pp. 2489-2499, 2015. Besides, in another approach, it is also possible to harvest electrical potential using other novel shapes and versatile forms of materials.

Bu et al. presented that the force exerted by fluid flow through cylindrical structures can be a prospective source of energy harvesting. These types of flow induced, very low frequency energy harvesters are fabricated and tested with different fluids. However, the power output from all these cases is very low (microwatts range). L. Bu, X. Wu, X. Wang, and L. Liu, "Liquid encapsulated electrostatic energy harvester for low-frequency vibrations," *Journal of Intelligent Material Systems and Structures*, vol. 24, no. 1, pp. 61-69, 2013. Another possibility in energy harvesting field is the use of metamaterials for this purpose. The metamaterials possess an important property which is the negative index. See M. Saadatzi, F. Mir, M. N. Saadatzi, V. Tavaf, and S. Banerjee, "Modeling of a 3D acoustoelastic metamaterial energy harvester," in *Active and Passive Smart Structures and Integrated Systems XII,* 2018, vol. 10595, p. 105952U: International Society for Optics and Photonics. This property has opened new windows of energy harvesting using metamaterials. New studies and researches are being performed using metamaterial with various design modifications and some of them showed very high efficiency. Using adjustments with the metamaterials, various energy harvesting cells with specific properties can be generated. One of such is phononic crystal-based metamaterial, which has been introduced recently. The phononic crystals have cavity in between them. These cavities trap acoustic energy inside them at certain resonance frequencies. Depending on the material properties of the cell constituents, the resonance frequency of the phononic crystal may change. This trapped acoustic energy can be harvested using smart materials such as PZT, PVDF etc. Gonella et al. first introduced the concept where simultaneous wave filtering and energy harvesting is possible. See S. Gonella, A. C. To, and W. K. Liu, "Interplay between phononic bandgaps and piezoelectric microstructures for energy harvesting," *Journal of the Mechanics and Physics of Solids*, vol. 57, no. 3, pp. 621-633, 3/2009. These materials can be used for trapping acoustic waves.

This is possible because of the low transmissibility of the cells at certain frequency ranges. As a result, low frequency stop band filters can be designed. According to the research done so far, it is possible to recover the trapped strain energy in the soft cell constituent using embedded piezoelectric wafers. Maximum power can be harvested at the resonance frequency when the piezoelectric wafer is strained at its maximum due to the embedded resonator. It has also been established that, coupling of two different physics in a single phenomenon can enable energy harvesting at very low frequencies (~1 khz). Placement of cell constituents in the form or different geometrical patterns can be a prospective way to harvest energy from the ambient sources. A recent study verifies that by using multiple piezoelectric materials inside metamaterial cells, it is possible to harvest trapped energy in milliwatts range (mw). See F. Mir, M. Saadatzi, R. U. Ahmed, and S. Banerjee, "Acoustoelastic MetaWall noise barriers for industrial application with simultaneous energy harvesting capability," *Applied Acoustics*, vol. 139, pp. 282-292, 2018.

For this disclosure, a novel energy harvester is proposed where the piezoelectric material, Polyvinylidene Difluoride (PVDF), is placed in the heart of a metallic frame in the form of snail structure. This model is capable of harvesting energy at multiple frequencies using only a unit cell device. At the same time, it can also harvest energy under a variety of vibration environments with an identical base structure procedure.

Energy Harvester's Modeling

The CAD design and the components utilized in this proposed metamaterial vibration base energy harvester cell are described here. In the next step, a numerical study of the cell using finite element analysis (FEA) in COMSOL Multiphysics software is presented to outline the acousto-dynamic behaviors of the proposed energy harvester cell.

Structural Design of Phononic Crystal Cell

In the last decade, several metamaterial structures have been proposed for the purpose of electrical energy scavenging. These metamaterial devices are called Phononic crystals, which are categorized based on their capabilities of entrapping vibrational energy in their structural components. In this study, a metamaterial phononic crystal, inspired from the shape of a snail shell, with the possibility of harvesting electrical potential at different low vibration frequency (<1000 Hz) is proposed. The proposed harvester cell is able to target different ranges of frequencies by changing the material properties and by altering the proposed geometry configurations. Phononic crystals are generally modelled based on a mass in mass configuration. In a phononic crystal with s specific designed geometric arrangement, a negative effective dynamic mass happens at the resonance frequencies, see F. Mir et al., *Applied Acoustics*. At these resonance frequencies, the wave energy is trapped inside the soft material constituents as dynamic strain energy.

The metamaterial based proposed phononic crystal presented here as an energy harvester unit comprises a cylindrical aluminum frame as a housing to encapsulate a silicon-piezoelectric structure inside itself. This silicone-piezoelectric structure consists of a Polyvinylidene Difluoride film and a specific mixture of Tin-cure silicone rubber. FIGS. 1 and 2 demonstrate the CAD view of the proposed cell modelled in SolidWorks software. In this proposed energy harvester cell, Polyvinylidene Difluoride which is mimicking a snail shell configuration is deliberately surrounded in a smooth Tin-cured silicone rubber that has the desired material properties. The overall dimensions of the Polyvinylidene Difluoride configuration and the cylindrical silicone rubber are presented in FIG. 2. The 2 mm thick aluminum frame surrounds the rubber-piezoelectric structure. Table 1, see FIG. 9, reports the material properties in which authors utilized during numerical analysis. During design of the phononic crystal for the proposed energy harvester, the surface of the Polyvinylidene Difluoride film was kept perpendicular to the desired excitation direction which is considered vertical in this case.

Numerical Analysis

In this study, a numerical modeling using finite-element analysis in the COMSOL Multiphysics software is described with the intention of the verification of the proposed metamaterial vibration base energy harvester's behavior excited by vibrational energy. Hence, the phononic crystal was numerically excited in, (i) Eigenfrequency study and, (ii) piezoelectric device environment to obtain the available resonance frequencies. After performing the Eigenfrequency analysis, several resonance frequencies were found. FIG. 3 displays the Eigenfrequency responses of the proposed design's constituents at different Eigenfrequencies. For the proposed design, resonance frequencies of 190.55 Hz, 196.27 Hz, 196.57 Hz, 278.64 Hz, and 280.41 Hz are reported from numerical analysis.

It is essential to remark that the resonance frequencies can be changed to target different resonance frequencies by increasing or miniaturizing the proposed model configuration. Besides, the reported resonance frequencies and, the corresponding band gaps, can be changed by changing the adjustment in the size of the aluminum frame and the Polyvinylidene Difluoride film. Similarly, weakly-dispersed band gaps are created due to local resonance in the silicone matrix. With targeting different frequency ranges for different applications, the proposed harvester cell can provide another desired frequency range by varying the material properties of the silicone matrix.

Experimental Validation and Testing

In this section, the fabrication of the proposed energy harvester is described along with the required vibration exciter and whole experimental setup.

Fabrication of the Energy Harvester Unit Cell

In this subsection the goal is to experimentally validate the numerical analysis for the proposed idea which is a piezoelectric vibration base energy harvester. FIG. 5 at c demonstrates the fabricated model of the energy harvester unit cell which is custom made in Integrated Material Assessment & Predictive Simulation Laboratory (iMAPS). In the first step, the cylindrical silicone matrix containing the Polyvinylidene Difluoride and the required wiring and circuitry is fabricated. For this purpose, an Aluminum frame is prepared based on the desired dimensions utilizing Lathe machine and milling machine. Accurate machining of the frame is one of the key elements in having accurate electrical potential outcomes following the numerical analysis. The inner diameter of the Aluminum frame is precisely machined and polished to be at 60 mm with tolerance of ~±0.05 mm. The height of the frame is also accurately finished to be at 10 mm. the thickness of the frame is set to be at 3 mm and eventually another Aluminum circular shape lid is fabricated to be used as a cap to cover the bottom side of the energy harvester Aluminum frame.

In the next strep Polyvinylidene Difluoride is accurately laser cut to the CAD modelled spring shape utilizing a single spot laser cutter, which is an optical and mechanical system, allowing to precisely cut sensitive and treated materials with extremely small accuracy (μm scale). Upon assembly of the aluminum frame parts, the Polyvinylidene Difluoride is stretched to its accurate dimension and placed in the middle of the Aluminum frame. Upon placement of the Polyvinylidene Difluoride, liquid silicone rubber (Mold Star 20T) is poured in the frame. The cure time of the rubber is 30 minutes. During this 30 minutes, the surface of the liquid silicone is flattened by placing a flat glass plate on the Aluminum frame. This process and the corresponding timing were developed after a few trials in order for the silicone rubber parts to have a seamless and homogenous bond. After having the silicone matrix entirely cured, the final dimensions and weight of the unit cell is precisely measured to follow the exact considered material properties in numerical modeling. At this level, the energy harvester unit cell is fabricated.

Required Vibration Exciter Experimental Setup

In this subsection, for the purpose of validation of the functionality of the fabricated vibration base energy harvester's performance, a precise vibration excitation machine which works in a wide range of frequencies and which is capable of applying constant force in constant acceleration is utilized. Therefore, in iMAPS laboratory, we have designed and fabricated an Acousto-Electrodynamic Vibration Exciter machine which is called, AEVE 3D machine. This machine is capable of providing coupled/uncoupled vibrations in a wide frequency range in form of acoustic vibration or mechanical vibration. See M. Saadatzi, M. N. Saadatzi, V. Tavaf, and S. Banerjee, "AEVE 3D: Acousto electrodynamic three-dimensional vibration exciter for engineering testing," IEEE/ASME *Transactions on Mechatronics*, vol. 23, no. 4, pp. 1897-1906, 2018 and M. Saadatzi, M. N. Saadatzi, R. Ahmed, and S. Banerjee, An electro-dynamic 3-dimensional vibration test bed for engineering testing (SPIE Smart Structures and Materials+Nondestructive Evaluation and Health Monitoring). SPIE, 2017. FIG. 5 at a demonstrates a general view of the AEVE 3-D machine which consists of three mechanical shakers and three load speakers. They are electrically synchronized and assembled in three Cartesian directions. The desired sinusoidal signals with desired frequency are generated and separately fed to each actuator. In this study, only the mechanical excitation portion of the machine is utilized to perform the experiment. FIG. 5 at b demonstrates the placement of the fabricated energy harvester unit cell in the heart of the AEVE-3D machine. The unit cell is firmly fixed in AEVE 3-D so that the direction of the excitation is perpendicular to the surface of the Polyvinylidene Difluoride.

Results and Discussion

After performing the first set of simulations in COMSOL Multiphysics with the aim of finding Eigenfrequencies in, (i) Eigenfrequency study and, (ii) at piezoelectric device environment in COMSOL Multiphysics, the exact model of the vibration base metamaterial energy harvester was excited again in COMSOL Multiphysics to investigate the harvester's power output in a wide range of frequency containing resonance frequencies in, (i) frequency domain study and, (ii) at piezoelectric device environment. Inserting an input oscillation load was considered to the bottom of the model with the aim of understanding the oscillation pattern of the unit cell of the energy harvester. Oscillation load was applied along the axis perpendicular to the surface of the Polyvinylidene Difluoride material. At frequencies in the vicinity of resonance, the unit cell behaves like a medium with a negative effective dynamic mass due to special decay of wave amplitude as reported in the stablished literature, see Id—F. Mir et al., *Sensors and Smart Structures.*

During the performance of the experiment on the proposed fabricated energy harvester, range of sinusoidal signals with frequencies from 180 Hz to 300 Hz, evenly distributed at every 1 Hz, were generated by the AEVE 3-D's main electronic module and, after an amplification stage, were fed to the corresponding axis of the machine with RMS acceleration of 2 g ($g=9.81\ m/s^2$).

Figure 10:
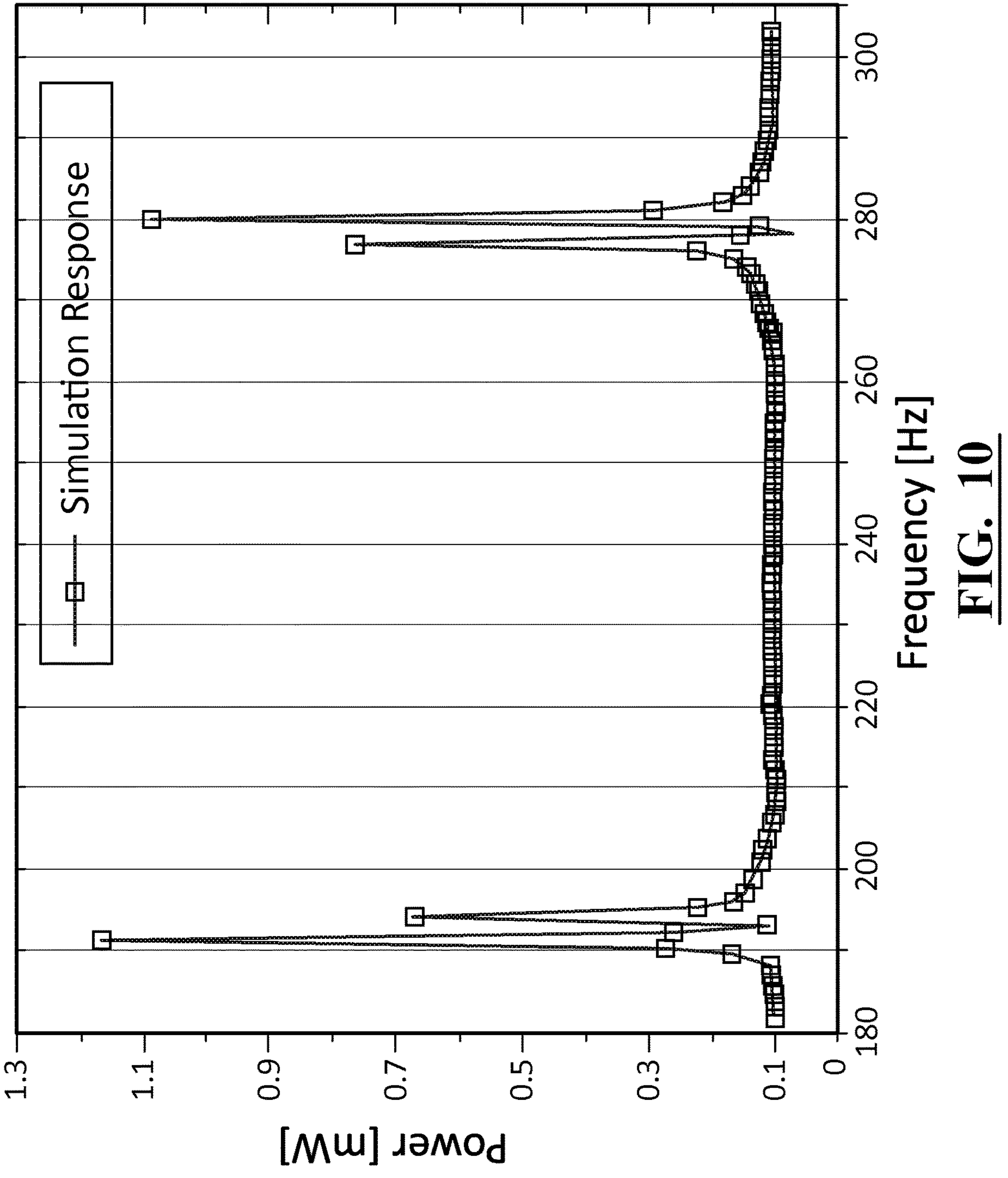
FIG. 10 shows numerical output power of the harvester cell against a 10 kΩ load.

Furthermore, in the excitation experiment, the output voltage of the energy harvester was accurately recorded against a 10 kΩ resistive load, and the output power was calculated by monitoring the voltage of the connected load. Each excitation experiment was repeated 20 times with the aim of improving the accuracy of the output power at each frequency. This 10 kΩ resistor was also added to the numerical study with the purpose of having the same scenario for both experimental and numerical studies. Results of the numerical analysis are presented in FIG. 10. FIG. 10 shows that at 5 different resonance frequencies of the proposed energy harvester cell, we have the maximum output power which are at 190.55 Hz, 196.27 Hz, 196.57 Hz, 278.64 Hz, and 280.41 Hz.

The maximum output power during experimental validation also occurs at resonance frequencies which are similar to frequencies of numerical study, respectively. The experimental results of the output power of the proposed cell is presented in FIG. 11. However, the experimental and the numerical results are in a very close agreement with each other, there is still a negligible deviation between both FEA and experimental results. A number of factors may contribute to this discrepancy such as human error, fabrication errors, mismatches in the material properties, imperfections in the placement and tilt of the PVDF material, ambient temperature, and imperfect adhesion between layers.

Figure 11:
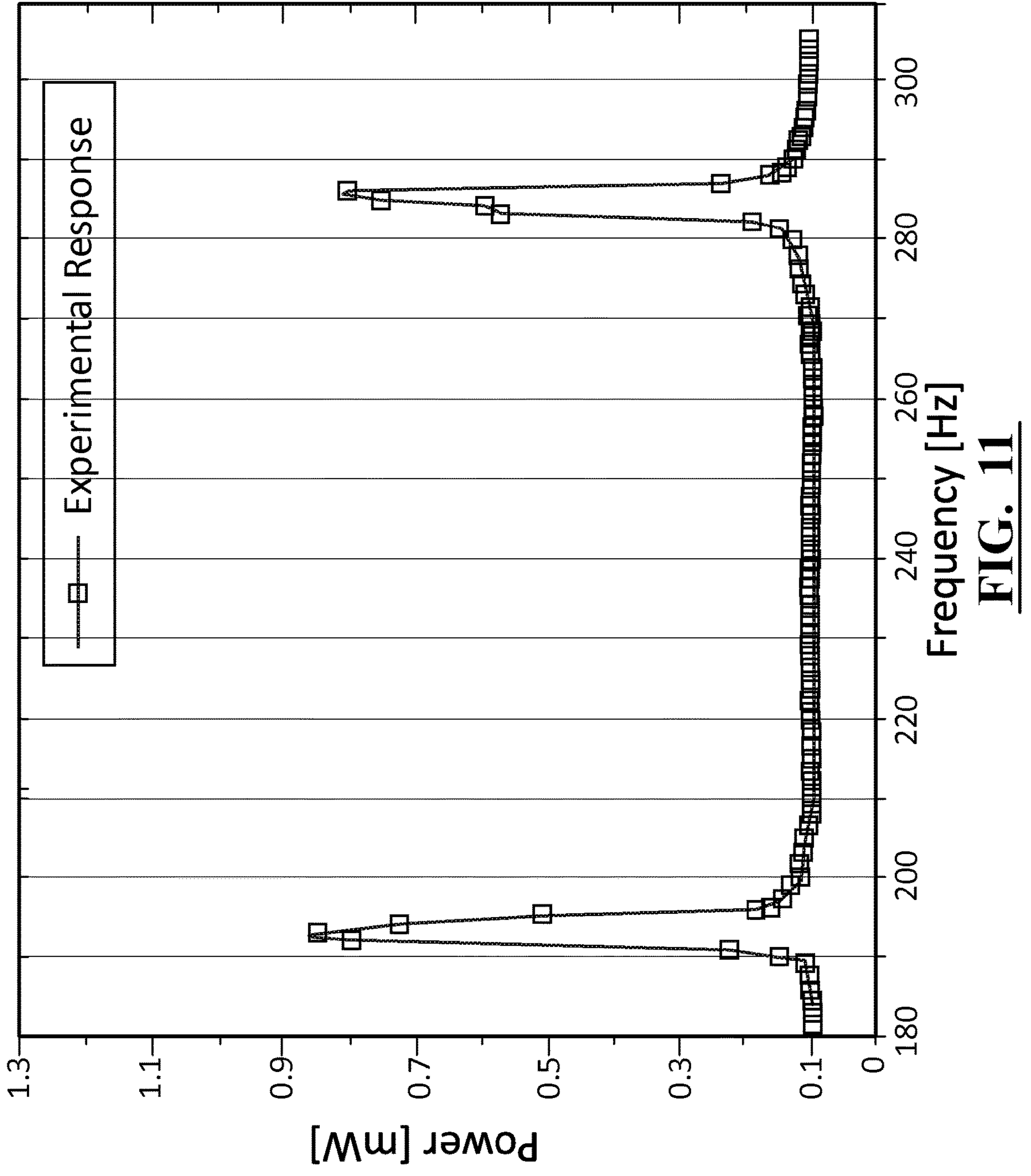
FIG. 11 experimental output voltage of the harvester cell against a 10 kΩ load.

By comparing both experimental and simulation results in FIGS. 10 and 11, it can be seen that the proposed cell is responding to the same numerically found resonance frequencies by FEA tool.

CONCLUSION

As the result of the restricted availability and large diminution of nonrenewable energy sources along with ecological apprehensions, the scientific community tends to propose new techniques to scavenge clean energy sources. Here, we provide a new piezoelectric vibration base energy harvester inspired from a metamaterial structure, which is capable of scavenging energy from multiple low-frequency ambient vibration frequencies. The proposed energy harvester cell was numerically modeled via COMSOL Multiphysics software. A proof of concept of the proposed cell was also fabricated and experimentally tested. The proposed energy harvester is comprised of a PVDF piezoelectric snail structure (in the form of a stretched spring), compressed in a cylindrical silicone matrix.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A novel energy harvester comprising:

at least one piezoelectric membrane comprising at least one phononic crystal formed into a three-dimensional spiral pattern;

a flexible matrix to contain the piezoelectric membrane, which is embedded into and surrounded by the flexible matrix, wherein the matrix is designed to allow the piezoelectric membrane comprising the three-dimensional spiral pattern to flex and deform; and a casing enclosing the matrix and the piezoelectric membrane.

2. The novel energy harvester of claim 1, wherein the three-dimensional spiral pattern defines at least four spirals in the three-dimensional spiral pattern.

3. The novel energy harvester of claim 1, wherein the piezoelectric membrane is formed from polyvinylidene fluoride.

4. The novel energy harvester of claim 1, wherein the matrix is formed from silicone or polydimethylsiloxane.

5. The novel energy harvester of claim 1, wherein at least one spiral plane of the piezoelectric membrane is oriented substantially parallel to a casing top and casing bottom enclosing the matrix and the at least one piezoelectric membrane.

6. The novel energy harvester of claim 1, wherein the casing is formed from aluminum.

7. The novel energy harvester of claim 1, wherein two or more piezoelectric membranes are contained within the matrix.

8. The novel energy harvester of claim 7, wherein the two or more piezoelectric membranes are spaced horizontally and vertically from one another.

9. The novel energy harvester of claim 7, wherein the two or more piezoelectric membranes are oriented in opposite directions with respect to one another in the matrix.

10. The novel energy harvester of claim 7, wherein the two or more piezoelectric membranes are separated into at least two layers in the matrix wherein the two or more piezoelectric membranes do not occupy the same plane in the matrix.

11. The novel energy harvester of claim 1, wherein at least one resonance frequency is trapped within the matrix as dynamic strain energy.

12. The novel energy harvester of claim 11, wherein the at least one resonance frequency trapped within the matrix as dynamic strain energy is changed from one resonance frequency to a different resonance frequency by changing a size of the at least one piezoelectric membrane or the casing.

13. The novel energy harvester of claim 1, wherein the novel energy harvester is contained within a floor tile, carpet section, mat, wall, or shoe sole.

14. A method for making a novel energy harvester comprising forming at least one piezoelectric membrane comprising at least one phononic crystal;

forming the at least one piezoelectric membrane comprising at least one phononic crystal into a three-dimensional spiral pattern;

creating a flexible matrix to contain the piezoelectric membrane, which is embedded into and surrounded by the flexible matrix, wherein the matrix allows the piezoelectric membrane comprising the three-dimensional spiral pattern to flex and deform; and forming a casing to enclose the matrix and the piezoelectric membrane.

15. The method for making a novel energy harvester of claim 14, further comprising defining the three-dimensional spiral pattern to have at least four spirals in the three-dimensional spiral pattern.

16. The method for making a novel energy harvester of claim 14, further comprising forming the piezoelectric membrane from polyvinylidene fluoride.

17. The method for making a novel energy harvester of claim 14, further comprising orienting at least one spiral plane of the piezoelectric membrane substantially parallel to the casing top and bottom enclosing the matrix and piezoelectric membrane.

18. The method for making a novel energy harvester of claim 14, further comprising including two or more piezoelectric membranes within the matrix.

19. The method for making a novel energy harvester of claim 18, further comprising spacing the two or more piezoelectric membranes horizontally and vertically from one another.

20. The method for making a novel energy harvester of claim 18, further comprising orienting the two or more piezoelectric membranes in opposite directions with respect to one another in the matrix.

21. The method for making a novel energy harvester of claim 18, further comprising separating the two or more piezoelectric membranes into at least two layers in the matrix wherein the two or more piezoelectric membranes do not occupy the same plane in the matrix.

22. The method for making a novel energy harvester of claim 14, further comprising trapping at least one resonance frequency within the matrix as dynamic strain energy.

23. The method for making a novel energy harvester of claim 14, further comprising changing the at least one resonance frequency trapped within the matrix as dynamic strain energy from one resonance frequency to a different resonance frequency by changing a size of the at least one piezoelectric membrane comprising at least one phononic crystal or the casing.

* * * * *